Figure 1:
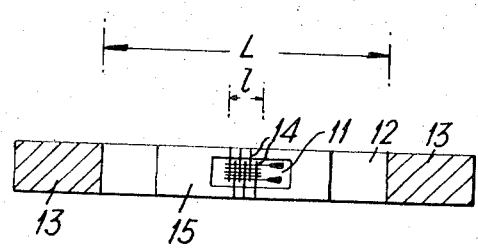

United States Patent [19]
Thomas

[11] 3,782,178
[45] Jan. 1, 1974

[54] FATIGUE SENSORS

[75] Inventor: Ernest Derek Reginald Thomas, Banstead, England

[73] Assignee: Hawker Siddeley Aviation Limited, Kingston-upon-Thames, Surrey, England

[22] Filed: July 28, 1971

[21] Appl. No.: 166,775

[30] Foreign Application Priority Data
July 31, 1970   Great Britain ................... 37,143/70

[52] U.S. Cl. ................................. 73/88.5 R, 73/91
[51] Int. Cl. ............................................ G01n 3/32
[58] Field of Search ..................... 73/88, 88.5 R, 91

[56] References Cited
UNITED STATES PATENTS
3,272,003   9/1966   Harting ................................. 73/91
2,920,480   1/1960   Haas ................................... 73/88 R
2,449,883   9/1948   De Forest ............................ 73/100
3,602,041   8/1971   Weinert ................................ 73/116

FOREIGN PATENTS OR APPLICATIONS
147,834   9/1960   U.S.S.R. ................................. 73/91

Primary Examiner—Jerry W. Myracle
Attorney—Rose & Edell

[57] ABSTRACT

An assembly of strain gauges, constituting a fatigue sensor, in which each strain gauge is mounted on a strain multiplier, in the form of a slotted sub-base, and the multiplication factor of each strain multiplier is different.

4 Claims, 4 Drawing Figures

Inventor
ERNEST DEREK REGINALD THOMAS

By Rose & Edell
Attorneys

FATIGUE SENSORS

This invention relates to strain gauges employed as fatigue sensors.

When a strain gauge is used as a fatigue sensor, the problems of low overall sensitivity of the sensor, and a fairly sharp lower limit of strain below which the sensor shows little or no response, may be overcome by mounting the sensor on a strain multiplier. In a typical arrangement, the sensor is mounted on a metal sub-base that is bonded at its end regions to the structure under test and has at its central region parallel transverse slots extending part-way across the metal sub-base from opposite sides in alternate staggered relationship. The sensor spans the slotted region of the sub-base and is bonded to a thin film or strip interlayer of some suitable elastic material which is in turn bonded to the sub-base. The multiplication factor of strain experienced by the sensor is approximately $0.9 L/l$, where $L$ is the length of the sub-base between the bonded regions, and $l$ is the length of the slotted region.

The response of a fatigue sensor to fluctuating strain is similar to that of a conventional strain gauge but, unlike the latter, removal of an applied strain does not result in a complete recovery of the initial quiescent resistance. The small permanent change in resistance is cummulative with successive strain cycles, so that a measurement of the change is some measure of fatigue experience.

Since only a single value of resistance change is given by the sensor when interrogated, it is necessary to attribute to this change a corresponding amount of fatigue damage in the structure to which it is attached. It has been shown that in extreme cases the sensor can give seriously erroneous indications. For example, a radically increased life can be obtained from a structure subjected to constant amplitude strain cycling if it occasionally receives single strain cycles capable of stress-relieving it. The sensor gives no corresponding reduction in overall resistance change. Although the sensor can be calibrated for the anticipated fatigue spectrum to be received, if in practice the latter differs significantly from the assumption, errors can be expected.

An object of the invention is to deal with this possible source of error.

According to the present invention, instead of a single fatigue sensor strain gauge, a battery of strain gauges is employed mounted on individual strain multipliers giving different multiplying factors.

Figure 2:
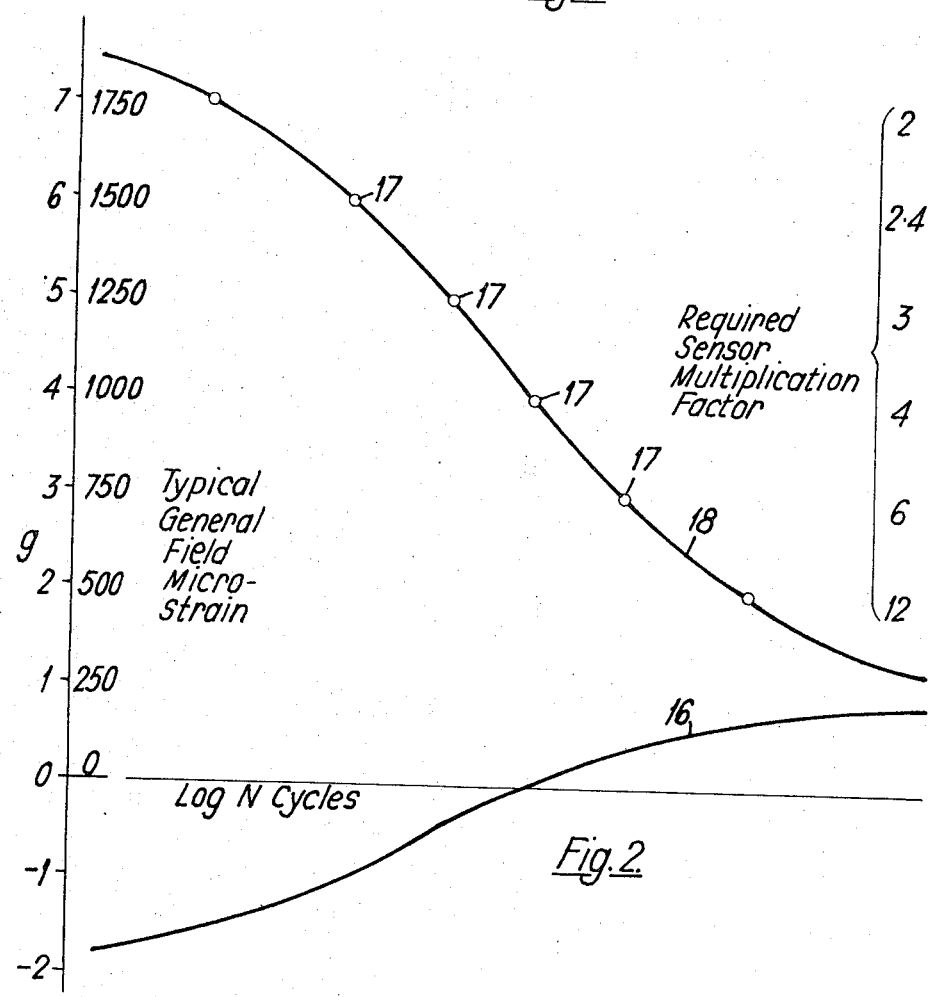
Figure 3A:
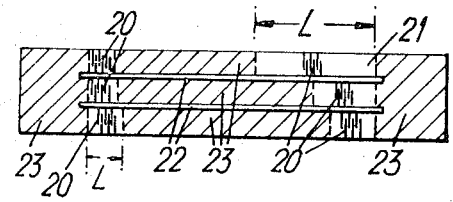
Figure 3B:
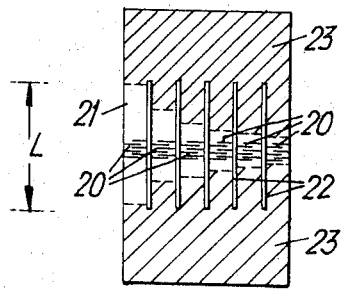

The practice of the invention will now be described in more detail with reference to the accompanying drawings, in which:

FIG. 1 shows a typical arrangement of a strain gauge mounted on a strain multiplier, FIG. 2 is a graphical presentation of characteristics useful in explaining the purpose of the invention, FIG. 3a shows one embodiment of the invention, and FIG. 3b shows another embodiment.

Referring firstly to FIG. 1, this shows a typical arrangement of a strain gauge sensor 11 mounted on a strain multiplier in the form of a metal sub-base 12 that is bonded at its end regions 13 to the structure under test and has at its central region parallel transverse slots 14 extending part-way across the metal sub-base from opposite sides in alternate staggered relationship. The sensor 11 spans the slotted region of the sub-base 12 and is bonded to a thin film interlayer 15 of elastic material which is itself bonded to the sub-base 12. $L$ and $l$ are the free length between the bonded regions 13 and the length of the slotted region, respectively, and the strain multiplication factor is approximately $0.9 L/l$.

Curve 16 in FIG. 2 shows a normal $g$ maneuver spectrum for a high-performance aircraft. Such spectra are obtained from flight aircraft by means of counting accelerometers at the aircraft centre of gravity, the curve representing values of g plotted against the logarithm of N, the number of strain cycles.

Currently available fatigue sensors have a strain sensitivity threshold of approximately 3,000 microstrain ($\pm$ 1,500 microstrain — the sensors being equally responsive to compressive and tensile strains). If, in a strain field of uniform or known gradation of intensity, a number of sensors are mounted on multipliers of differing multiplication factors, each will respond only to those strain cycles occurring above their factored sensitivity thresholds. With cummulative successive differences, incremental values of resistance change due to bands of loads are obtained from the respective sensors, thus generating a series of point values, i.e. the circled points 17 in FIG. 2, which lie on a curve 18 that is characteristic of the fundamental spectrum.

Thus, the several fatigue sensors on multipliers of different factors (2, 2.4, 3, 4, 6 and 12 in the case illustrated), used at a common data point, give not only an indication of fatigue history, but also information on the nature of the imposed spectrum, thus overcoming the danger of misinterpretation of the sensor output.

In practice, some complication can be expected where the spectrum is asymmetric, as in FIG. 2, since the sensors will give the span of positive to negative excursions. The positioning of the zero strain line must then be inferred by supplementary data.

The mutliplier array can conveniently be disposed as shown in FIG. 3a or FIG. 3b. A one-piece sub-base is possible, formed by spark-erosion or die-cutting techniques.

In FIG. 3a, six similar sensors are employed in association with six slotted regions 20 of the sub-base 21 disposed in two sets of three toward opposite ends of the sub-base. In each set of three the slotted regions 20 are separated from one another by longitudinal channels 22 cut through the sub-base. The areas 23 of the sub-base that are bonded to the structure under test are shown hatched, from which it will be seen that the dimension L determining the multiplying factor is different in each case.

In FIG. 3b, the sub-base 21 is wider and shorter, all six sensors being placed over slotted regions 20 disposed alongside one another across the sub-base and separated by channels 22 as before. Again, the dimension L is different in each case.

In the case of a single sensor-multiplier instrument, duplication or triplication of the instrument at each data point is necessary in order to obtain a parity check on correct functioning. In many cases the multiple array will not need such duplication, since a peculiarity of the output in one element would readily be apparent when compared with the others.

What I claim is:

1. A fatigue sensor assembly comprising a plurality of strain multipliers constituted by different regions of a common sub-base, each said region being both slotted and differently dimensioned from the other said regions whereby each gives a different multiplying factor, and an equal number of identical strain gauges each individually mounted on a respective one of said strain multipliers.

2. An assembly according to claim 1, wherein each different slotted region of the sub-base lies within an individual portion of the sub-base that extends between regions of the sub-base that are bonded to the structure under test, the unbonded length of said individual sub-base portion between said bonded regions being different for each strain multiplier, and each said individual sub-base portion being separated from another such portion or portions alongside it by channels cut through the sub-base.

3. An assembly according to claim 2, wherein all the individual sub-base portions are alongside one another in a series separated by parallel longitudinal channels in the sub-base.

4. An assembly according to claim 2, wherein the individual sub-base portions are arranged in two groups toward opposite ends of the sub-base.

* * * * *